July 18, 1967

T. E. DAVIES 3,331,594

METHOD AND APPARATUS FOR SCALE FREE HEATING OF METALS

Filed Feb. 23, 1965

INVENTOR.
THEODORE E. DAVIES
BY Whittemore,
Hulbert & Belknap
ATTORNEYS

INVENTOR.
THEODORE E. DAVIES
BY Whittemore,
Hulbert & Belknap
ATTORNEYS

July 18, 1967 T. E. DAVIES 3,331,594
METHOD AND APPARATUS FOR SCALE FREE HEATING OF METALS
Filed Feb. 23, 1965 7 Sheets-Sheet 5

INVENTOR.
THEODORE E. DAVIES
BY Whittemore,
Hulbert & Belknap
ATTORNEYS

July 18, 1967 T. E. DAVIES 3,331,594
METHOD AND APPARATUS FOR SCALE FREE HEATING OF METALS
Filed Feb. 23, 1965 7 Sheets-Sheet 7

INVENTOR.
THEODORE E. DAVIES 3,331,594
METHOD AND APPARATUS FOR SCALE FREE HEATING OF METALS
Theodore E. Davies, Grosse Ile, Mich., assignor to The North American Manufacturing Company, Cleveland, Ohio, a corporation of Ohio
Filed Feb. 23, 1965, Ser. No. 434,510
24 Claims. (Cl. 263—15)

This application is a continuation-in-part of patent application Ser. No. 289,876, filed June 24, 1963, now U.S. Patent No. 3,170,681.

The invention relates to a process and structure for heating materials in a non-oxidizing, or scale free atmosphere and refers more specifically to a separate wall unit for incorporation into furnace structure and a unique process and structure for mixing and controlling mixed air and gas and the combustion thereof in furnace structure to produce scale free heating of metals.

It is known that steel and other metals will not oxidize or scale when heated in an atmosphere produced by the combustion of a fuel such as natural gas and less than fifty percent of the stoichiometric amount of air. However, to effect combustion of such an air-gas fuel mixture, it is necessary to preheat either the air or the air-gas fuel mixture. Even when the air or air-gas fuel mixture is preheated to the highest economical limit, 1000° F. to 1200° F., the theoretical flame temperature obtained by burning natural gas fuel with less than fifty percent stoichiometric air is less than 2900° F. This is too cold to serve as the sole source of heat for commercial forging and heat treating furnaces. To obtain the necessary additional heat, secondary air, to bring the total air up to the stoichiometric amount of air, may be added to the products of the primary combustion. This results in secondary combustion which has a theoretical flame temperature in excess of 4000° F. It is necessary that the products of this secondary combustion do not come into contact with the material to be heated while the material is at a scaling temperature of 1300° F. and above and that the products of the secondary combustion somehow transfer heat to the material to be heated.

In the past it has been attempted to provide heat from the secondary combustion on the material to be heated by producing the secondary combustion in a secondary combustion chamber separated from the material to be heated by a refractory partition. This structure and resulting process for heating the material by secondary combustion has not been commercially acceptable because first, the heating rate expressed as pounds of metal per hour, per square foot of hearth in such a furnace is so low that impractically large furnaces must be employed. Second, the secondary combustion chamber must be maintained at a very high temperature with this structure and process resulting in extremely high flue gas temperatures and therefore unacceptable fuel efficiencies.

It has also been proposed that a continuous furnace be constructed in which the work to be heated is made to travel through a preheat zone and a soak zone of the furnace with the non-scaling primary combustion taking place in the soak zone, while the secondary combustion takes place in the preheat zone. This structure and resulting process for scale free heating of materials has similarly not proved commercially successful. The difficulty with this process and structure is that the heat available from the primary combustion in the soak zone is not sufficient to heat the work rapidly and economically from 1500° F. to a working temperature of 2300° F. and in this temperature range, ferrous metals will scale if not surrounded by products of combustion resulting from fuel mixed with less than fifty percent stoichiometric air.

In these prior attempts to commercially heat material in a non-oxidizing atmosphere, the difficulty has been that no one has provided the secondary combustion in the same combustion chamber with the primary combustion without any intervening partition which would allow a high rate of radiant heat transfer from the secondary combustion to the work at all times during a heating cycle. Also, in the past the combustion of the primary fuel mixture has sometimes not been complete before coming into contact with the work due to low residence time of the primary air and gas fuel mixture so that oxidation of the work and/or soot accumulations thereon has occurred. Wherein air has been mixed with gas in different zones of a single combustion chamber no automatic means for varying the proportion of the air placed in the furnace in a particular zone responsive to furnace operation has been provided so that the secondary air has often been allowed to slop down on the work at low air velocities during low heating rates to again produce oxidation of the work.

In addition, prior furnaces, particularly furnaces for scale-free heating of metal, have been deficient in that it has been difficult to shut down a furnace while a furnace operator is at lunch or away from the furnace for short intervals due, for example, to possible overheating of furnace hardware having no cooling fuel or air flowing therethrough. Thus, fuel and air conduits in a recuperator may melt due to heat from surrounding refractory material when low or no fuel or air is flowing therethrough. With such structures if the air and fuel conduits are placed outside of the furnace preheating of the primary air and gas fuel mixture has not been accomplished.

Also, in the past furnaces have usually been constructed by building furnace hardware, such as nozzles, piping, eductors, blowers and the like into refractory furnace material at the furnace location. This is undesirable, both from the standpoint of the furnace designers who would rather the furnace hardware be installed under more controlled conditions and from the point of view of installation time and space requirements.

Therefore, one of the purposes of the present invention is to provide an improved process for scale-free heating of metal.

Another object is to provide improved furnace structure for the scale-free heating of metal.

Another object is to provide a separate wall unit for use in furnace structure for the scale-free heating of metal.

Another object is to provide furnace structure as set forth above including a recuperator and enclosed air and fuel conduits.

Another object is to provide a process for scale-free heating of metal comprising burning gas with less than the stoichiometric amount of air and heating the metal with the combustion products and subsequently burning the combustion products with sufficient air to make up the stoichiometric amount directly above the work, without an intervening wall.

Another object is to provide a process as set forth above including effecting the primary combustion in a catalytic matrix below the material to be heated whereby the primary combustion is completed before the work is heated with the primary combustion products to assure a non-oxidizing atmosphere about the workpiece.

Another object is to provide a process as set forth above and further including dividing the secondary air into middle and upper air and controlling the division thereof in accordance with the heat desired.

Another object is to provide a process as set forth above and further including preheating the air and gas.

Another object is to provide furnace structure as set forth above wherein the furnace has a single combustion chamber and means are provided for feeding a primary air and gas fuel mixture and secondary air including middle and upper secondary air into separate zones of the single combustion chamber in a predetermined ratio in accordance with the heating desired.

Another object is to provide furnace structure as set forth above and further including means for reversing the ratio of middle and upper secondary air on furnace turndown.

Another object is to provide furnace structure as set forth above and further including means for fully reacting the primary air and gas mixture before it reaches work in the furnace.

Another object is to provide a process and structure as set forth above which is simple, economical and efficient.

Other objects and features of the invention will become apparent as the description proceeds, especially when taken in conjunction with the accompanying drawings, illustrating a preferred embodiment of the invention, wherein.

With particular reference to FIGURES 1–4 of the drawings, one embodiment of the present invention will now be considered in detail.

Figure 1:
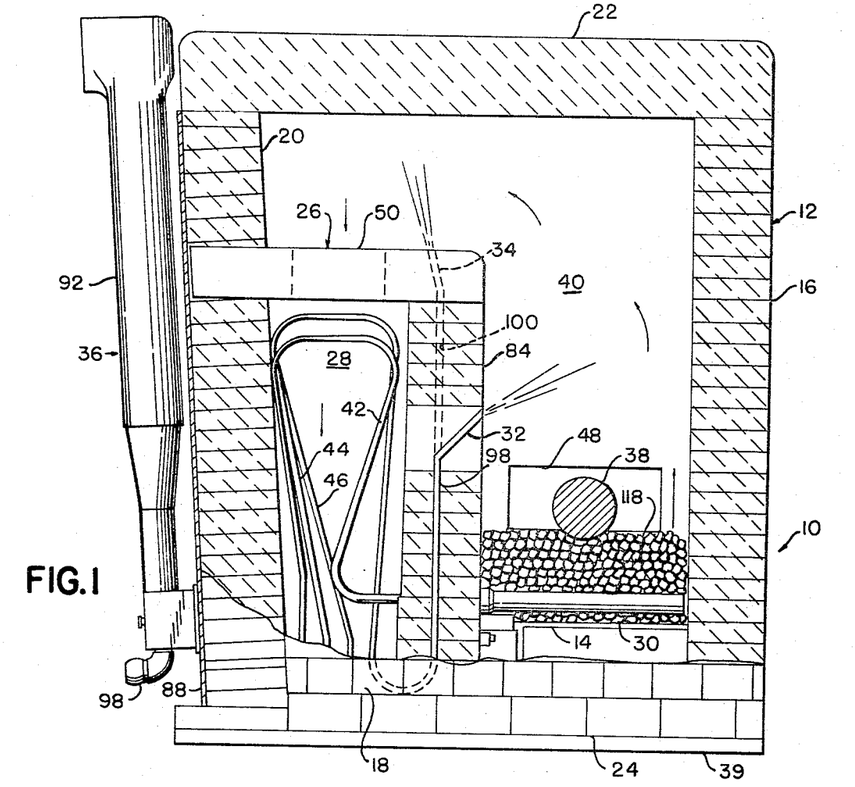
FIGURE 1 is a broken away diagrammatic end view of furnace structure including a separate wall unit constructed in accordance with the invention.

As shown best in FIGURE 1, the furnace structure 10 includes a furnace 12 having a hearth 14, a front wall 16, end walls 18, a partial back wall 20 and a top and bottom 22 and 24, respectively. The separate wall unit 26 which is also a part of the furnace structure 10 includes a recuperator chamber 28, primary air and gas mixture ribbon burners 30, middle and upper secondary air nozzles 32 and 34, respectively, primary air and gas conduits 42, middle and upper secondary air conduits 44 and 46 and eductors 36.

In operation work 38 is heated in combustion chamber 40, first by means of the combustion of a preheated primary air and gas mixture from burner 30 in the chrome ore catalyst 118 under work 38. The work 38 is then heated by radiation from secondary combustion of the products of the first combustion of the primary air and gas mixture and middle secondary air from nozzle 32 also in combustion chamber 40 but over work 38. The secondary combustion gases are subsequently completely burned with upper secondary air from nozzle 34 still in combustion chamber 40, after which the final combustion gases are passed through the recuperator chamber 28 and out of the furnace structure 10 through the eductor 36.

During the usual heating operation of the furnace structure 10 the primary air is substantially the same as the secondary air and the middle secondary air is substantially greater than the upper secondary air. On furnace turn-down, such as during periods of short non-use of the furnace, the proportion of the total secondary air fed into the combustion chamber 40 through nozzles 32 and 34 is reversed to provide lower combustion chamber heat and air cooling of the secondary air and primary air and gas mixture conduits 42, 44 and 46 in the recuperator chamber 28.

More specifically the furnace 12 which is intended to be completely constructed by a furnace builder includes a bottom 24 which, as previously indicated, may be constructed of refractory material, a hearth 14 set on the bottom 24, as shown best in FIGURE 1, a refractory front wall 16 extending for substantially the entire height of the furnace 12 between the bottom 24 and roof 22 thereof and refractory end walls 18.

The end walls 18 may be provided with an opening 48 so that the workpiece 38 may travel continuously through the furnace 12, if desired. Alternatively doors may be provided in the front wall 16 of the furnace 12. The rear wall portion 20 is also constructed of material, such as refractory brick, and rests on the top 50 of the separate wall unit 26.

In one embodiment it is contemplated that the furnace 12 will have a minimum height of approximately fifteen inches from hearth level to the support 39 on which the furnace is positioned and will have a hearth to roof dimension of sixty inches with a hearth width of thirty-six inches. Further, the furnace 12 is contemplated to have a hearth no wider than eight feet or less than two feet in width with a maximum work height of fifteen inches.

Figure 2:
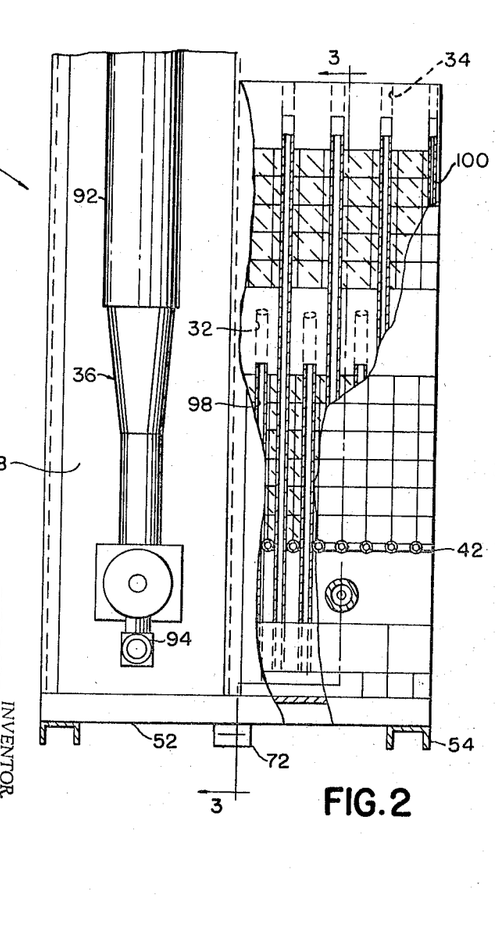
FIGURE 2 is an enlarged, partially broken away rear elevation view of the separate wall unit illustrated in FIGURE 1.
Figure 3:
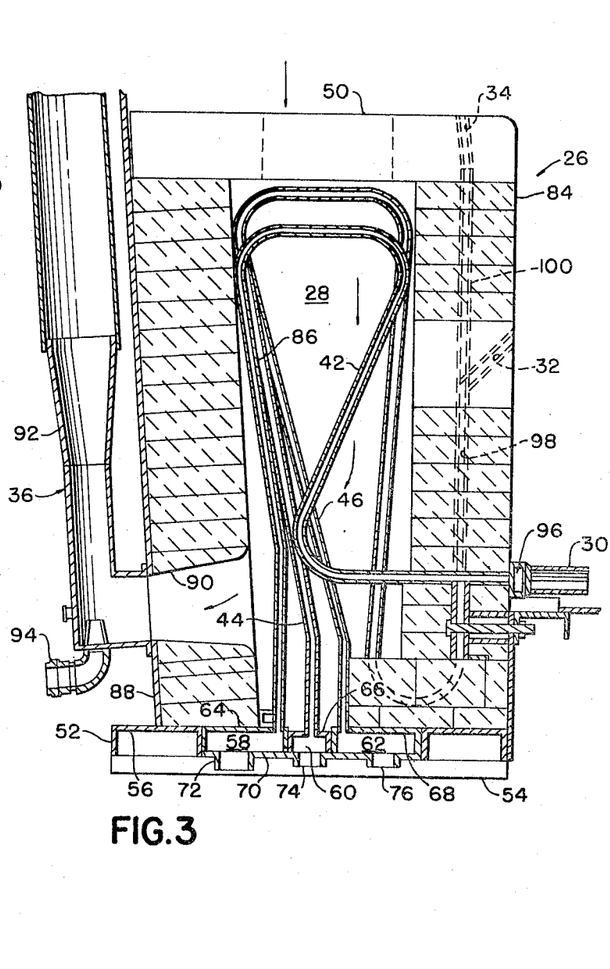
FIGURE 3 is an enlarged, transverse section view of the separate wall unit illustrated in FIGURE 1 taken substantially on the line 3—3 in FIGURE 2.
Figure 4:
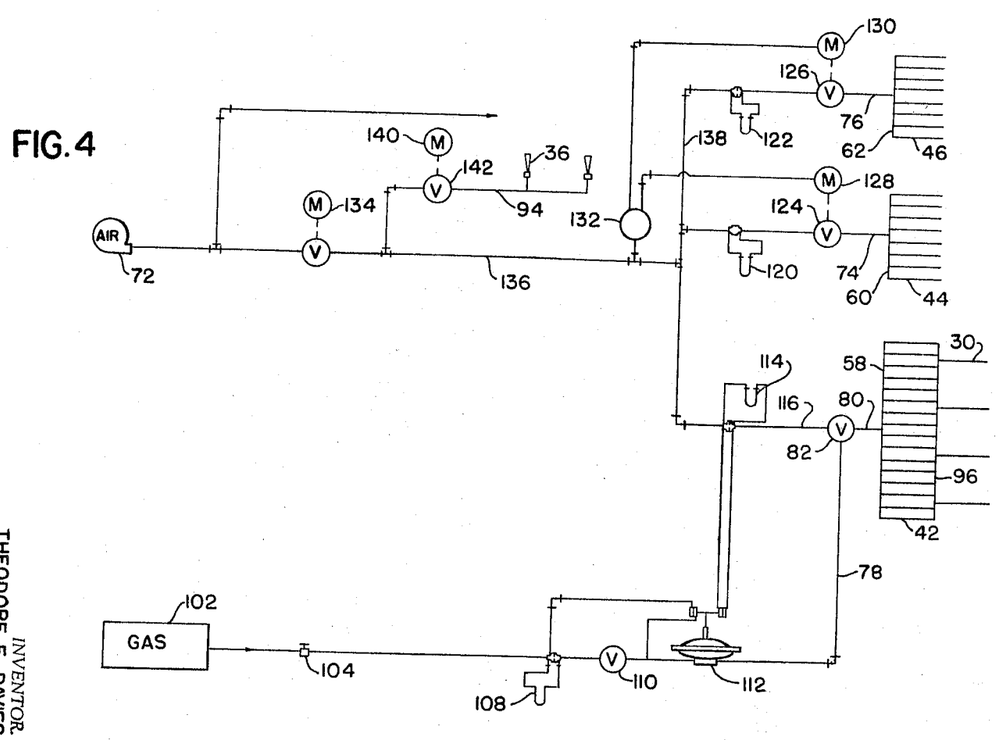
FIGURE 4 is a partly schematic, partly block diagram of the air and gas mixture control system of the furnace structure illustrated in FIGURES 1–3.

The separate wall unit 26, as best shown in FIGURES 2 and 3, includes a metal base 52 constructed of a pair of inverted channel members 54 extending transversely of the wall unit 26, front and back inverted channel member 56 secured to the ends of the channel members 54 by convenient means, such as welding, and plenum chambers 58, 60 and 62 extending substantially parallel to the channel members 56 and formed from the inverted channels 64, 66 and 68 and plate 70 secured thereto by convenient means, such as welding. The plenum chambers 60 and 62 associated with middle and upper secondary air respectively are connected to an air blower 72, as shown in FIGURE 4, through conduits 74 and 76, respectively. Plenum chamber 58 is connected to the blower 72 and the gas fuel source 102 through conduit 80 and mixing valve 82, as will be considered subsequently.

The recuperator chamber 28 is formed in the separate wall unit 26 by the vertically extending refractory front wall 84 and the rear refractory wall 86 in conjunction with the metal wall facing plate 88 and the recuperator roof 50. Recuperator roof 50 is slotted or constructed of perforated refractory tile so as to permit drawing of the final combustion gases from the combustion chamber 40 into the recuperator chamber 28 through the roof 50.

The eductor 36 includes the opening 90 through the rear wall 86 of the recuperator 26, the eductor pipe 92 secured over the opening 90 and the air supply conduit 94 from the blower 72 inserted in the eductor pipe 92, as shown best in FIGURE 3.

Air and gas primary fuel mixture conduits 42 are spaced longitudinally of the wall unit 26 at predetermined intervals of, for example, two and one-quarter inches. The air and gas primary fuel mixture conduits 42 are connected between the plenum chamber 58 and the plenum chamber 96. The burners 30 are connected to the plenum chamber 96 at intervals of, for example, nine inches to receive the air and gas mixture from four of the conduits 42 connected to the plenum chamber 58. The primary air and gas fuel mixture conduits 42 are constructed of high heat resistance alloy metal and are cooled in operation either by the air and gas fuel mixture flowing therethrough which is in turn preheated to between 600° F. and 1200° F. or by the upper secondary air from the nozzle 34.

The secondary air conduits 44 extend from the plenum chamber 60 through the recuperator chamber 28 and are connected to middle air nozzles 32 through passages 98 in the front wall 84 of the wall unit 26. The upper secondary air conduit 46 is connected between the plenum chamber 62 and the upper air nozzle 34 through the passage 100 in the front wall 84 of the wall unit 26. The secondary air conduits 44 and 46 are alternated longitudinally of the separate wall unit 26 as are the passages 98 and 100. The alternate air conduits 44 and 46 are, for example, spaced apart four and one-half inches along the length of the separate wall unit 26 and are positioned between primary air and gas mixture conduits 42.

As shown best in FIGURE 1, the ribbon burners 30 are placed in a catalytic matrix bed of, for example, one-half inch raw lump chrome ore on which the work 38 rests, so that adequate residence time will be present between the time that the primary air and gas fuel mixture is ignited at the ribbon burners 30 and the time at which the combustion products pass the work to complete primary combustion so that no oxidation or scale or soot formation will be present on the workpiece. The chrome ore acts as a catalyst for the burning of the natural gas with less than the stoichiometric amount of air.

The control of the primary air and gas fuel mixture and the middle and upper secondary air and the flow thereof through the furnace structure 10 will be considered in detail in conjunction with the schematic representation of the furnace control system illustrated in FIGURE 4.

In FIGURE 4 gas is supplied from a fuel source 102 through the gas fuel conduit 78 having a cut-off valve 104, and a gas metering manometer 108 in series therein. The cut-off valve 104 is of course provided to cut off the gas fuel to the furnace structure 10 when the furnace is completely shut down. The manometer 108, together with the ratio valve 110 also in the conduit 78 and the ratio regulator 112 connected to the primary air manometer gage 114 establish and maintain the primary air to gas fuel ratio. Cut-off valves, manometer gages, and ratio valves and regulators are well known in the furnace art and will not therefore be considered in detail herein. It will be noted however that the selected ratio regulator 112 is of a type to be adjusted to provide a richer primary air to gas fuel ratio during furnace turn-down operation.

A primary air and gas fuel mixture of approximately fifty percent stoichiometric air and gas is passed from conduits 78 and 116 into conduit 80 and then to the plenum chamber 58, previously considered. The primary air and gas fuel mixture then passes through the conduits 42 in the recuperator chamber 28 where it is preheated to a temperature in excess of 500° F. The preheated fuel from conduits 42 is fed into the plenum chamber 96 and subsequently is ignited at the ribbon burners 30. The primary combustion gases pass upward through the catalytic matrix 118 and subsequently pass around the work 38 in an oxygen deficient condition so that heating of the work 38 to a relatively high temperature without oxidation, scale or soot accumulation may be accomplished.

As shown in FIGURE 4, the manometer gages 120 and 122, as well as ratio switching valves 124 and 126 and motors 128 and 130, respectively, are positioned in the air supply conduits 74 and 76 up-stream of the plenum chambers 60 and 62. The orifices associated with the monometer gages 120 and 122 are so related to the orifice associated with the manometer gage 114 that the remaining fifty percent of stoichiometric air for complete combustion of the gas required in furnace structure 10 passes through the air supply conduits 74 and 76.

Motors 128 and 130 are two-position motors operable to reverse the valves 124 and 126 when they are actuated to, for example, provide four volumes of air in plenum chamber 60 and one volume of air in plenum chamber 62 during normal operation of the furnace structure 10 and to porvide four volumes of air in plenum chamber 62 and one volume of air in plenum chamber 60 during low furnace firing rate or turn-down, such as when the furnace operator goes to lunch. This lower volume of middle secondary air coupled with an increase in the primary air prevents the secondary air or combustion products from drifting down on the work 194 and producing oxidation and scaling thereof. The lower volume of air coming from the middle air nozzle 32 at this time also provides a lower combustion chamber temperature and cooler air circulation over the conduits 42, 44 and 46 to prevent damage thereto due to the high temperature of the surrounding ceramic material forming the recuperator chamber 28 and the loss of cooling effect due to low flow of gas and air through the conduits during low furnace firing rates on furnace turn-down. Motors 128 and 130 are actuated in response to reduced air flow in air supply conduit 136, such as one-quarter of the air flow for normal furnace heating operation.

The air from middle air nozzles 32 in normal operation burns with the primary combustion products from burners 30 to provide secondary combustion above the work 38 to radiate heat on the work 38 and further heat the work. The middle air nozzles 32 are inclined upwardly and the air is directed therefrom with a positive velocity to prevent slopping of the middle air downwardly in the combustion chamber 40 into contact with the work 38 which would cause oxidation and scaling thereof. Subsequently the combustion products of the secondary combustion is burned with the upper secondary air from the upper air nozzle 34 to complete the burning of the gas, after which the final combustion product is drawn through the recuperator chamber 28 and is passed out of eductors 36.

The temperature of the single combustion chamber 40 and the furnace pressure are sensed by convenient temperature sensing means which are operable to actuate the throttling motor 134 to reduce air flow through the air supply conduit 136 to air supply conduit 138 connected to the air supply conduits 74 and 76 and the air supply conduit 116. The temperature of the furnace may thus be maintained within a safe preselected range. A similar throttling motor 140 which is responsive to furnace pressure is operable to vary the opening of the valve 142 providing air from air supply conduit 136 to eductor air conduits 94.

Thus, it will be seen that there is provided furnace structure 10 including a separate furnace wall unit 26 which may be adapted for use in a plurality of different types of continuous or batch-type furnaces; such as slot type, box type, pusher, walking-beam, rotary, roller hearth, roll-down, or conveyer belt furnaces. Such furnaces may be used in a plurality of operations, such as forging, upsetting, seamless tube manufacturing, copper brazing, annealing, sintering, malleableizing and heating steel prior to rolling. In addition the furnace provided includes enclosed gas and air conduits and permits the furnace to be turned down to very low fuel inputs while still preventing sealing of the work in the furnace.

In addition, the heating rate using the above process and structure exceeds one hundred pounds of steel per hour per square foot of hearth raised from room temperature to forging temperature. Other scale free methods of heating heat less than fifty pounds of metal per square foot of hearth per hour. The fuel efficiency with the disclosed process and structure exceeds thirty-five percent whereas other scale free methods operate in the neighborhood of ten to fifteen percent.

Figure 5:
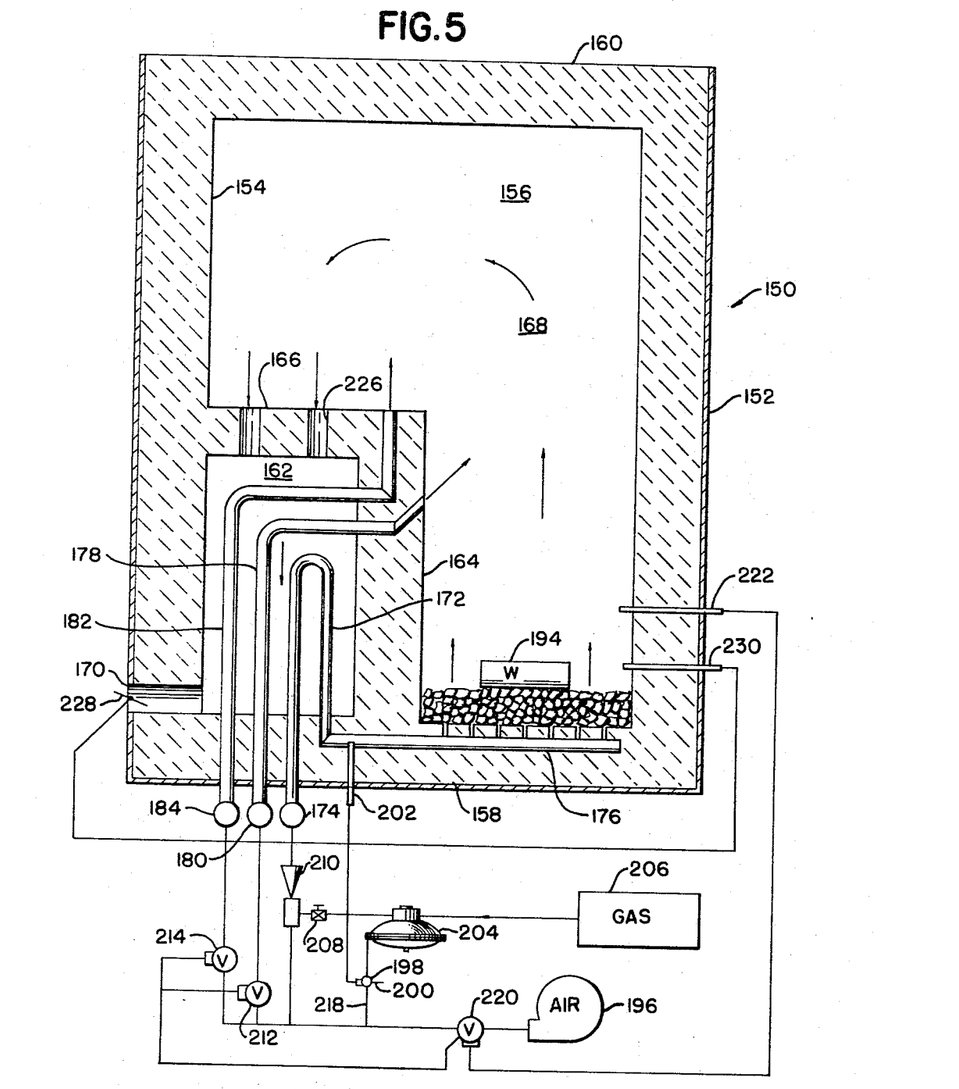
FIGURE 5 is a diagrammatic transverse section view of modified furnace structure similar to that illustrated in FIGURE 1.
Figure 6:
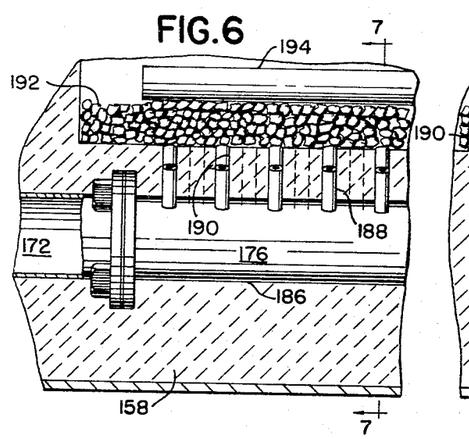
FIGURE 6 is an enlarged view of a portion of the section of the furnace structure illustrated in FIGURE 5.
Figure 7:
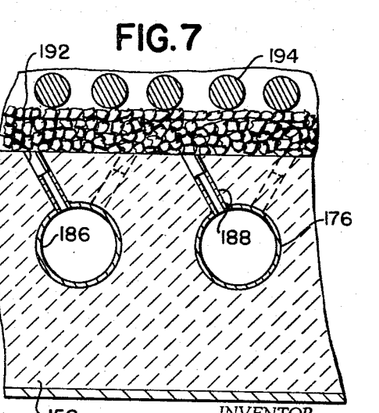
FIGURE 7 is a section view of the portion of the furnace structure illustrated in FIGURE 6 taken substantially on the line 7—7 in FIGURE 6.

Modified furnace structure 150 similar to the furnace structure 10 illustrated in FIGURE 1 is illustrated in FIGURES 5-7. The furnace structure 150 includes refractory front, back and end walls 152, 154 and 156, respectively. The refractory floor 158 and refractory roof 160 complete the enclosure of the furnace structure 150.

A longitudinally extending recuperator chamber 162 is formed in the furnace structure 150 by the vertical wall 164 and the horizontal recuperator chamber top 166. The wall 164 and top 166 separate the recuperator chamber 162 from the single combustion chamber 168 of the furnace structure 150. Recuperator chamber 162 is exhausted through passage 170 which may be connected to an eductor (not shown), such as the eductor 36 of furnace structure 10.

Again a plurality of separate conduits 172 are provided in the furnace structure 150 and are spaced apart longitudinally thereof for supplying a primary air and natural gas fuel mixture from manifold 174 to the burners 176. Middle secondary air conduits 178 are connected to the secondary air supply manifold 180, while upper secondary air supply conduits 182 are connected to the secondary air supply manifold 184 extending longitudinally of the furnace structure 150.

As shown in FIGURES 6 and 7, the burners 176 are spaced apart longitudinally of the furnace structure 150 and are buried in the refractory floor 158 of the furnace structure 150. The burners 176 include the cylindrical portions 186 connected to the conduits 172 and the small tubular portions 188 extending transversely from the cylindrical portions 176 in communication with the interior thereof and extending into openings 190 in the refractory floor 158.

Catalytic matrix 192 is positioned on the floor 158 of the furnace structure 150 over the openings 190 therein to form a bed on which the work 194 may be positioned. Alternatively of course the work 194 may be supported by beams or the like extending over or embedded in the chrome ore 192. The catalytic matrix 192 again forms a catalyst to insure complete combustion of the preheated fuel and air mixture fed from burners 176 before the combustion products reach the work 194. A non-oxidizing atmosphere will therefore be present at the work 194 to produce scale free heating of the work without scoot accumulation on the workpieces 194.

The catalytic matrix may be a raw refractory material in lump form, such as chrome ore, a manufactured refractory material such as pellets, spheres, cubes, cylinders, rings, saddles, etc., or a porous refractory block or a perforated refractory block, or refractory fibre. The essential requirements are that the material must allow the upward passage of gas and it must expose a lot of surface area to catalyze the reaction between the primary air and gas.

In over-all operation of the furnace structure 150, at furnace start-up, when the recuperator chamber 162 is cold and the air supplied by the combustion blower 196 is not heated, the three-way valve 198 is opened to atmosphere through conduit 200 by the temperature sensitive control 202 responsive to the temperature in the primary gas and air supply conduits 172. At this time therefore the bottom of the atmospheric regulator 204 which may be a North American Series 7218 atmospheric regulator, available from the North American Manufacturing Company, 4455 E. 71st St., Cleveland, Ohio, will be opened to atmospheric pressure. With the bottom of the regulator 204 open to atmospheric pressure the valve 208 will be set to pass the volume of gas from the source of natural gas fuel 206 through the atmospheric regulator 204 necessary to provide a stoichiometric gas-air mixture from mixer 210. Mixer 210 may be an aspirator mixer of the 65 series, also available from North American Manufacturing Company.

During initial start-up the valves 212 and 214 which are responsive to the total air flow through valve 220 are maintained closed. After approximately twenty minutes when the recuperator is hot and the temperature of the primary air-gas mixture in conduit 172 has risen to between 600° F. and 1200° F., the valve 198 is actuated to close the conduit 200 and open the conduit 218 whereby the atmospheric regulator 204 is then controlled in accordance with the air pressure from combustion blower 196 through air valve 220 and the relatively small pressure transfer conduit 218 to provide a primary air-gas mixture in burners 176 approximately one hundred percent richer than stoichiometric. The air valve 220 is controlled in accordance with the temperature sensitive control 222 responsive to the temperature of the combustion chamber 168 of furnace structure 150.

As the temperature rises and the flow of air through valve 220 rises the valves 212 and 214, which along with valve 220 may be 26 series butterfly valves, again available from North American Manufacturing Company, will be regulated to provide a predetermined ratio of middle to upper secondary air in the single combustion chamber 168. During usual heating operations the ratio of middle to upper secondary air will be approximately four to one.

Thus, during usual heating operations a primary air-gas fuel mixture which includes approximately fifty percent of the stoichiometric air for complete combustion of the gas is fed through burners 176 where ignition thereof is accomplished. The combustion products are passed upward through the chrome ore to insure complete burning of the primary air before the combustion products surround the work 194 to provide initial heating of work 194.

Middle secondary air from the conduits 178, the ends of which form secondary air nozzles, is mixed with the primary combustion products to provide secondary combustion in the single combustion chamber 168 directly above the work 194. The work 194 is thus also heated by radiation from the secondary combustion while a non-oxidizing atmosphere is maintained therearound due to the flow of the primary combustion products thereover. The middle secondary air may be forty percent of the stoichiometric air for the quantity of gas.

The secondary combustion products are then mixed with the remaining quantity of air from conduits 182, for example ten percent, to complete the combustion of the initial quantity of gas in the chamber 168 with a stoichiometric quantity of air. The final combustion products are then passed through openings 226 in the top 166 of the recuperator chamber 162 and into the recuperator chamber 162. The combustion gases in the recuperator chamber 162 preheat the air and the air-gas fuel mixture passing through the conduits 172, 178 and 182.

The combustion gases are then passed out of flue 170 past the pressure regulating means, such as the damper 228, or an eductor, as shown in conjunction with the furnace structure 10. The damper 228 may be controlled by the pressure sensitive control 230 responsive to the pressure in the furnace structure 150 adjacent the work 194.

The total quantity of air passed through valve 220 is controlled in accordance with the temperature sensitive control 222 to provide a predetermined heat in the single combustion chamber 168.

When a very low firing rate is desired, as for example when the forge hammer for which the work 194 is heated is being prepared and the work is soaking or during operator off time, such as lunch, the ratio of air passed by valves 212 and 214 is reversed so that the valve 212 will be nearly closed while the valve 214 will be open to provide, for example, a middle secondary to upper secondary air ratio of one to four. Also, at this time the regulator 204 is adjusted to provide a richer primary air to gas ratio. Such control of valves 212 and 214 and regulator 204 may be effected by limit switches on valve 220. The heat of the fire in the combustion chamber 168 is thus lowered and movement of products of secondary combustion down onto the work 194 at low firing rates is prevented.

Also, as before, the greater amount of air provided through conduits 162 the ends of which form the upper secondary air nozzles passing through recuperator chamber 162 will tend to cool the conduits 172, 178 and 182 during low firing rates so that the conduits will not be damaged due to the high heat of the surrounding refractory materials. The volume of cool air passing through the conduits 172, 178 and 182 during higher firing rates prevents the conduits from becoming destructively overheated.

Figure 13:
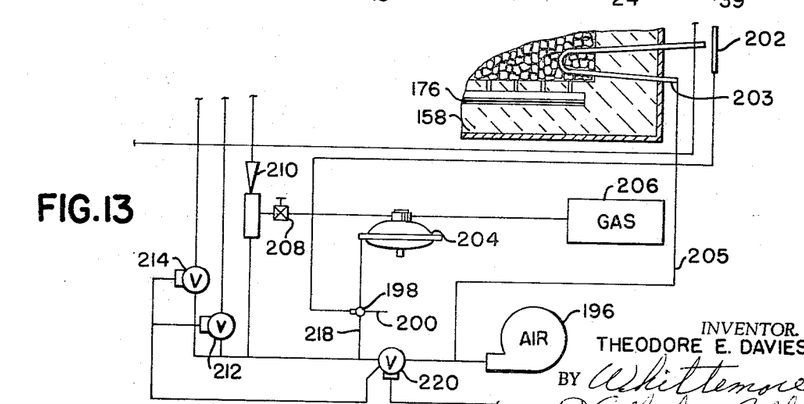
FIGURE 13 is a diagrammatic representation of a modification of the furnace structure illustrated in FIGURE 5.

Alternatively the temperature sensitive control 202 may be made responsive to the temperature of air passing through a heating conduit 203 placed within the catalytic matrix 192 within the combustion chamber 168, as shown in FIGURE 13. The air is supplied to conduit 203 through conduit 205 connected to the blower 196 at one end and to the conduit 203 at the other. As shown in FIGURE 13 the temperature sensitive control 202 is then positioned immediately adjacent the open upper end of the conduit 203.

Figure 8:
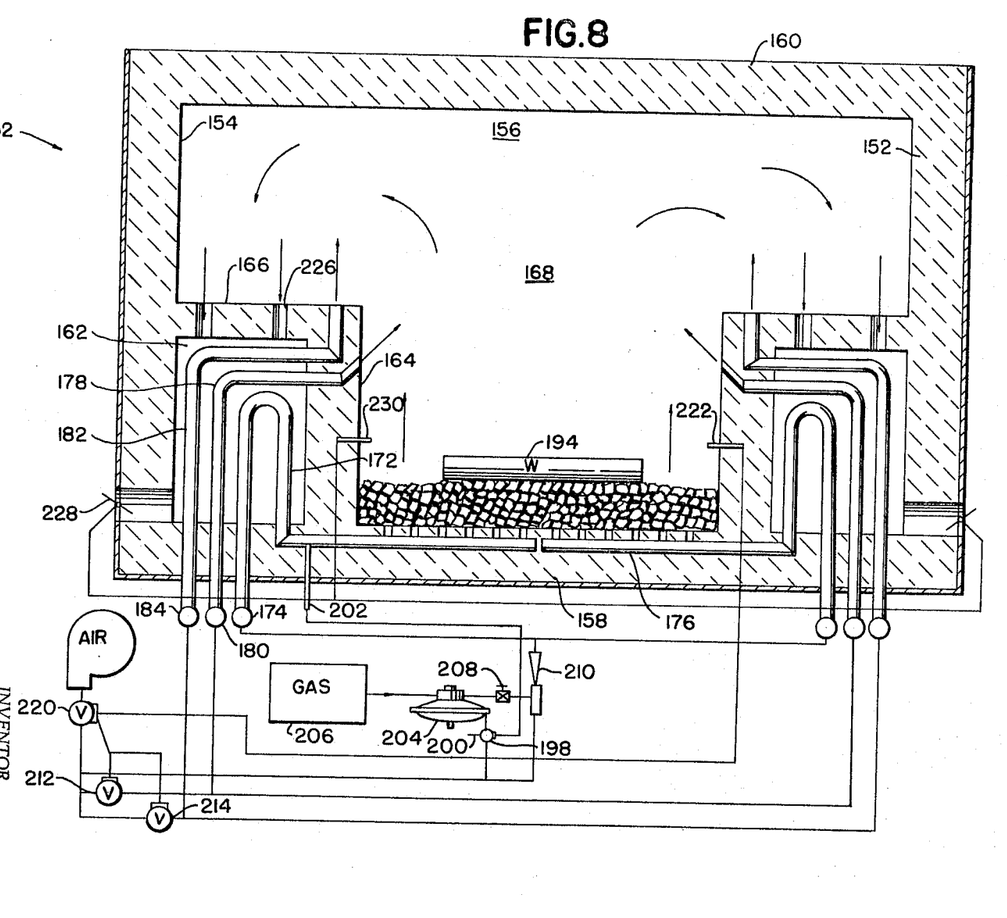
FIGURE 8 is a diagrammatic transverse section view of modified furnace structure similar to that illustrated in FIGURE 5.

The furnace structure 232, illustrated in FIGURE 8, is a modification of the furnace structure 150 and elements thereof are given the same reference numerals as corresponding elements in the furnace structure 150.

In the furnace structure 232 the double sided hearth is approximately six feet wide, whereas in the furnace structure 150 the single sided hearth is approximately three feet wide. Wider single sided hearths have been found to permit downward movement of secondary air onto the work which is objectionable. With the double sided hearth of furnace structure 232 including two recuperator chambers, two sets of burners and two sets of primary and middle and upper secondary air conduits, the furnace hearth width may be extended to approximately six feet without objectionable downward movement of secondary air onto the work at low firing rate. Both the furnace structure 150 and the furnace structure 232 may be as long as desired.

Figures 9, 10:
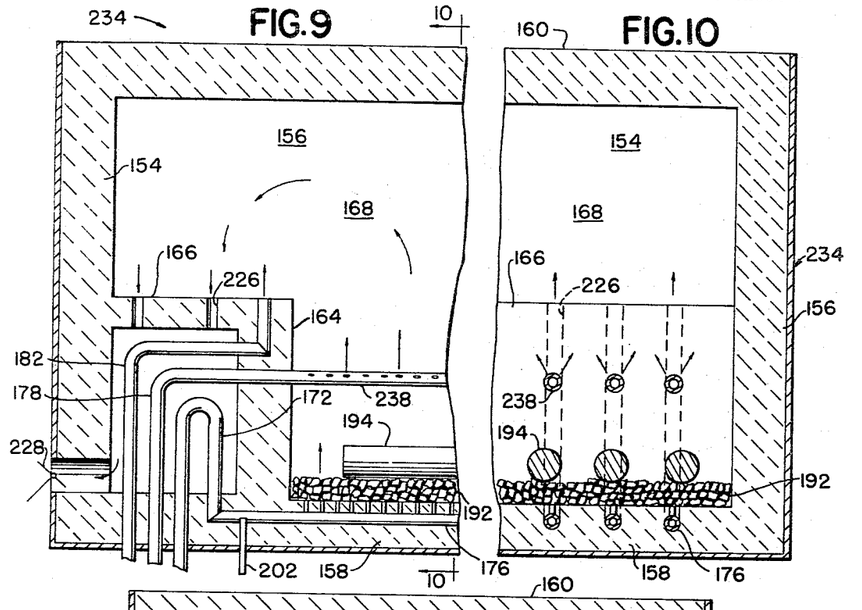
FIGURE 9 is a partial diagrammatic transverse section view of modified furnace structure also similar to that illustrated in FIGURE 5.
FIGURE 10 is a partial longitudinal section view of the furnace structure illustrated in FIGURE 9 taken substantially on the line 10—10 in FIGURE 9.
Figure 11:
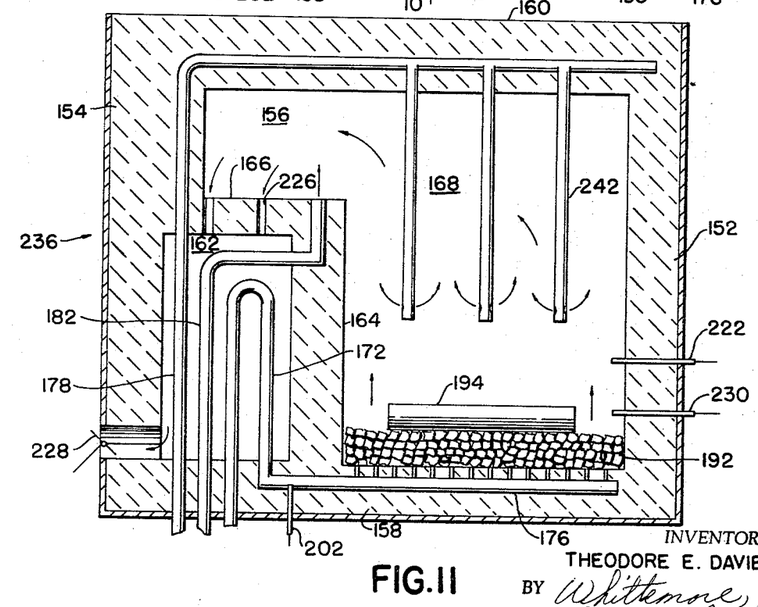
FIGURE 11 is a diagrammatic transverse section view of modified furnace structure again similar to that illustrated in FIGURE 5.

The modified furnace structures 234 and 236, illustrated in FIGURES 9, 10 and 11 are similar to the furnace structure 150 and similar elements have therefore been given similar reference characters.

In both the furnace structure 234 illustrated in FIGURES 9 and 10 and the furnace structure 236 illustrated in FIGURE 11 means are provided for feeding secondary air into the single combustion chamber over wide furnace hearths without spilling air onto the workpiece. Thus, in furnace structure 234 air discharge nozzles 238 are connected to the middle secondary air conduits 178 extending horizontally over the hearth. In furnace structure 236 the middle secondary air conduits 178 are extended into the roof 160 and the vertically extending air discharge nozzles 242 are dependent therefrom to supply the middle secondary air at a predetermined height in the single combustion chamber 168.

The separate controls for the furnace structures 234 and 236 have not been illustrated in detail. They are similar in all respects to the controls for furnace structure 150.

The furnace structure 244 illustrated in FIGURE 12 again includes a refractory furnace enclosure including the vertical side walls 246 and 248, vertical end wall 250, bottom 252 and top 254. Burners 256 similar to burners 176 are embedded in the refractory floor 252 of the furnace structure 244 and provide a primary air and fuel mixture through the chrome ore 258 wherein primary combustion is completed before the primary combustion products surround the work 260. Secondary air to make a stoichiometric volume of air in combination with the air in the primary air and gas fuel mixture from burners 256 is fed through the plenum chambers 260 and 262 along with the primary air from the combustion blower 264 through the air valve 266 controlled in accordance with the temperature sensitive control 268 responsive to the temperature in the single combustion chamber 270.

Figure 12:
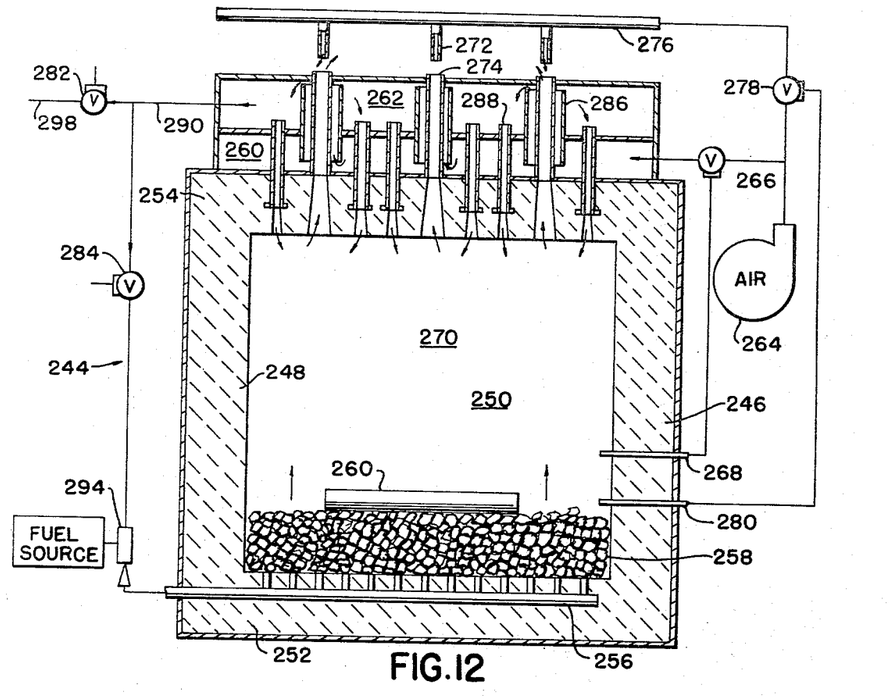
FIGURE 12 is a diagrammatic transverse section view of modified furnace structure similar to that illustrated in FIGURES 1 and 5.

Furnace pressure is regulated by the air jets 272 extending over flues 274 and connected to manifold 276. The air from jets 272 is controlled in accordance with the air valve 278 responsive to the pressure sensitive control 280. The jets 272 maintain the pressure in the combustion chamber 270 at a desired value.

The air valves 282 and 284 as before, may be controlled in accordance with the desired furnace temperature and determine division between primary and secondary air. Thus, in operation air from air valve 266 passes into plenum chamber 260 where it is heated and passes upwardly through the stacks 286 surrounding the flues 274 into plenum chamber 262. The heated air in plenum chamber 262 then either passes through the secondary air nozzles 288 or through conduit 290. The air passing into the conduit 290 either passes through air valve 284 to become primary air in the burners 256 through the mixing valve 294 or the air in conduit 290 passes through the air valve 282 and out of conduit 298 to atmosphere.

The natural stack action of the furnace through the flue 274 tends to produce a negative pressure in the furnace structure 244 at hearth level. Opening valve 278 increases the pressure in the furnace due to the action of the air jets 272 on the flues 274. The jets 272 and flues 274 may be spaced from six to twenty-six inches apart. The secondary air nozzles 288 are, as shown, placed intermediate the flues 274.

At normal firing rates valve 282 is fully closed and valve 284 is partially open. At low firing rates, valve 282 is partly open and valve 284 is fully open. This allows excess air through the recuperator at low firing rates for cooling purposes. It also reduces the amount of secondary air through jets 288 for a given amount of air through the burners 256. On low firing rates combustion is not completed until the rich flue gas still containing combustibles is mixed with the air from jets 272.

While an air fuel ratio regulator is not illustrated, it will be understood that controls similar to those used in conjunction with the furnace structures 10 and 150 may be used to control the flow of air through the valve 284 and to control the fuel air mixture through mixer 294 during furnace start up and subsequent heating including heating at low firing rates.

At low firing rates opening of valve 232 decreases the pressure in plenum chamber 262 to decrease the tendency for air passed through nozzles 288 or the combustion products thereof to float down over the work to cause oxidation and scaling thereof.

While one embodiment and modifications of the present invention have been disclosed in detail, it will be understood that other embodiments and modifications are contemplated. For example, in the furnace structure illustrated the valves and regulators which are required to change position at low firing rates may be operated from pressure switches in the air or gas lines, end switches (mercury switches) on the main temperature control valve, or the output signal from the main temperature sensitive control. Also, the secondary air may be introduced through diagonal tubes or any other method that introduces secondary air directly above the work throughout the entire period the work is in the furnace or in other words, above all of the work that is in the furnace at a given time. It is therefore the intention to include all embodiments and modifications as are defined within the appended claims within the scope of the invention.

What I claim as my invention is:

1. Furnace structure for the scale free heating of metals including a furnace having a single combustion chamber for receiving work positioned therein and a separate wall unit defining a part of the combustion chamber built into the furnace including a recuperator, means for supplying a primary air and gas fuel mixture in the single combustion chamber of the furnace below work positioned therein, means for supplying secondary air in the single combustion chamber above work positioned therein and eductor means for withdrawing secondary combustion products from the single combustion chamber through the recuperator.

2. Structure as set forth in claim 1 wherein the separate wall unit further includes means for preheating the primary air and gas fuel mixture supplied to the single combustion chamber.

3. Structure as set forth in claim 1 wherein the means for supplying a primary air and gas fuel mixture in the single combustion chamber comprises a burner extending from the recuperator into the chamber, a primary air and gas fuel mixture plenum chamber and air and gas fuel supply conduits passing from the plenum chamber through the recuperator to the burner.

4. Structure as set forth in claim 1 wherein the means for supplying secondary air in the single combustion chamber includes middle air discharge nozzles and upper air discharge nozzles supported on the recuperator and directed into the combustion chamber, middle and upper secondary air plenum chambers and separate air supply conduits extending from the middle and upper secondary air plenum chambers to the middle and upper air discharge nozzles.

5. Structure as set forth in claim 4 and further including air and fuel supply conduits connected to the plenum chambers and furnace control means connected in the conduits for providing a stoichiometric total air and gas fuel ratio in the furnace, approximately one-half of which is supplied in the primary air and gas fuel mixture and means for providing more middle secondary air than upper secondary air during usual furnace heating operations.

6. Structure as set forth in claim 5 wherein the furnace control means further includes means for changing the ratio of middle secondary air to upper secondary air on furnace turn-down.

7. Structure as set forth in claim 4 wherein the middle air discharge nozzle is positioned substantially centrally of the recuperator and is inclined upwardly.

8. Structure as set forth in claim 1 wherein the means for supplying air and gas to the combustion chamber comprises separate plenum chambers adjacent the recuperator for primary air and gas fuel mixture and for middle and upper secondary air, separate groups of conduits passing through the recuperator and connected to separate plenum chambers at one end, a burner adjacent the recuperator, extending into the combustion chamber and connected to the other end of the groups of conduits connected to the primary fuel mixture plenum chamber and air discharge nozzles connected to the other end of the groups of conduits connected to the plenum chambers for middle and upper secondary air and directed into the combustion chamber.

9. Control structure for a furnace for the scale free heating of metal including a gas conduit from a source of fuel, an air supply conduit from a source of air, a gas and air ratio meter connected between the gas and air conduits for setting the ratio of gas and air, a valve in said gas conduit for determining the absolute volume of gas passed through the gas conduit and a mixing valve connecting the gas and air conduits down-stream of the gas and air ratio meter for mixing the metered air and gas and air ratio meter for mixing the gas and air mixture from the mixing valve to burners, means for providing middle and upper secondary air from the source of air and means for regulating the proportion of secondary air to primary aim and for providing a predetermined ratio of middle to upper secondary air during normal furnace operation.

10. Structure as set forth in claim 9 wherein the control structure further includes means for changing the ratio of middle to upper secondary air on furnace turn-down.

11. Furnace structure for the scale free heating of metal including a single combustion chamber, a lower and upper plenum chamber positioned above the single combustion chamber, burners positioned below the single combustion chamber, means for supplying air into the lower plenum chamber, means for heating and transferring the air from the lower plenum chamber to the upper plenum chamber, means for mixing a portion of the air in the upper plenum chamber with gas-fuel and feeding the air-gas mixture into the combustion chamber through the burners, means for passing another portion of the air in the upper plenum chamber directly into the combustion chamber over the burners and means for withdrawing combustion products from the single combustion chamber.

12. Structure as set forth in claim 11 and further including means for controlling the quantity of air passed into the lower plenum chamber in accordance with the temperature in the combustion chamber and means for bleeding a controlled amount of air from the upper plenum chamber to atmosphere.

13. Structure as set forth in claim 12 and further including means for controlling the rate of exhaust of the combustion products from the single combustion chamber in accordance with the pressure in the lower combustion chamber.

14. Furnace structure for the scale free heating of metals comprising a single combustion chamber for receiving work positioned therein, means for supplying a less than stoichiometric primary air and gas fuel mixture to the single combustion chamber of the furnace below work positioned therein, means for supplying secondary air into the single combustion chamber directly above work positioned therein to provide secondary stoichiometric combustion adjacent the work with no intervening partitions between the secondary combustion and the work, means for withdrawing combustion products from the single combustion chamber, and means connected to the means for supplying primary air and gas fuel mixture for changing the ratio of primary air to gas fed to the single combustion chamber from a substantially stoichiometric ratio at furnace start-up to a five to one ratio during normal heating operations.

15. A process for scale free heating of metal comprising burning gas with less than the stoichiometric amount of air in a primary air-gas fuel mixture beneath the metal whereby the metal is heated by primary combustion products passing up and over the metal and subsequently burning the primary combustion products with sufficient secondary air to make up the stoichiometric amount directly above the metal without an intervening wall whereby the metal is heated by radiation from the secondary combustion and further dividing the secondary air into middle and upper secondary air with the middle secondary air being approximately four times the quantity of the upper secondary air.

16. The process as set forth in claim 15 and further including changing the ratio of middle to upper secondary air when a low heating rate is required.

17. A process for scale free heating of metal comprising burning gas with a stoichiometric amount of air in a primary air-gas fuel mixture beneath the metal on furnace start-up, whereby the metal is heated by primary combustion products passing up and over the metal, reducing the amount of primary air to approximately fifty percent of the stoichiometric amount of air as the furnace heat increases and burning the primary combustion products with sufficient secondary air to make up the stoichiometric amount directly above the metal without an intervening wall, whereby the metal is heated by radiation from the secondary combustion.

18. A process for scale free heating of metal comprising burning gas with less than the stoichiometric amount of air in a primary air-gas fuel mixture beneath the metal in a catalytic matrix to insure completion of the primary combustion before the combustion products pass over the metal to be heated whereby the metal is heated by primary combustion products passing up and over the metal and subsequently burning the primary combustion products with sufficient secondary air to make up the stoichiometric amount directly above the metal without an intervening wall whereby the metal is heated by radiation from the secondary combustion.

19. A process for scale free heating of metal comprising burning gas with less than the stoichiometric amount of air in a primary air-gas fuel mixture beneath the metal whereby the metal is heated by primary combustion products passing up and over the metal, burning the primary combustion products with secondary middle air directly above the metal without an intervening wall whereby the metal is heated by radiation from the secondary combustion and subsequently burning the secondary combustion products with upper secondary air sufficient when taken with the primary and lower secondary air to provide the stoichiometric amount of air for the gas provided in the primary air-gas fuel mixture whereby combustion of the gas is completed.

20. The process set forth in claim 19 and further including changing the ratio of primary to secondary air on furnace start-up.

21. The process set forth in claim 19 and further including changing the ratio of middle to upper secondary air when a low heating rate is required.

22. Structure for scale free heating of metal comprising first means for burning gas with less than the stoichiometric amount of air in a primary air-gas fuel mixture beneath the metal whereby the metal is heated by primary combustion products passing up and over the metal, second means positioned above the first means and the metal for burning the primary combustion products with middle secondary air directly above the metal without an intervening wall whereby the metal is heated by radiation from the secondary combustion and third means positioned above the second means for burning the secondary combustion products with upper secondary air sufficient to make up the stoichiometric amount of air for the gas in the primary air-gas fuel mixture whereby combustion of the gas is completed.

23. Structure as set forth in claim 22 and further including means connected to the first, second and third means for changing the ratio of primary air to secondary air as the metal is heated.

24. Structure as set forth in claim 22 and further including means connected between the second and third means for changing the ratio of middle to secondary air when a low heating rate is required.

References Cited

UNITED STATES PATENTS

| | | | |
|---|---|---|---|
| 2,254,047 | 8/1941 | Roth | 23—281 X |
| 2,587,900 | 3/1952 | Robiette | 148—16.7 X |
| 3,022,057 | 2/1962 | Schmidt et al. | 263—15 |

FREDERICK L. MATTESON, JR., *Primary Examiner.*

JOHN J. CAMBY, *Examiner.*